Nov. 12, 1974 E. HETZEL ET AL 3,847,964
MANUFACTURE OF PERFLUOROCARBOXYLIC ACID NITRILES
Filed Feb. 26, 1973
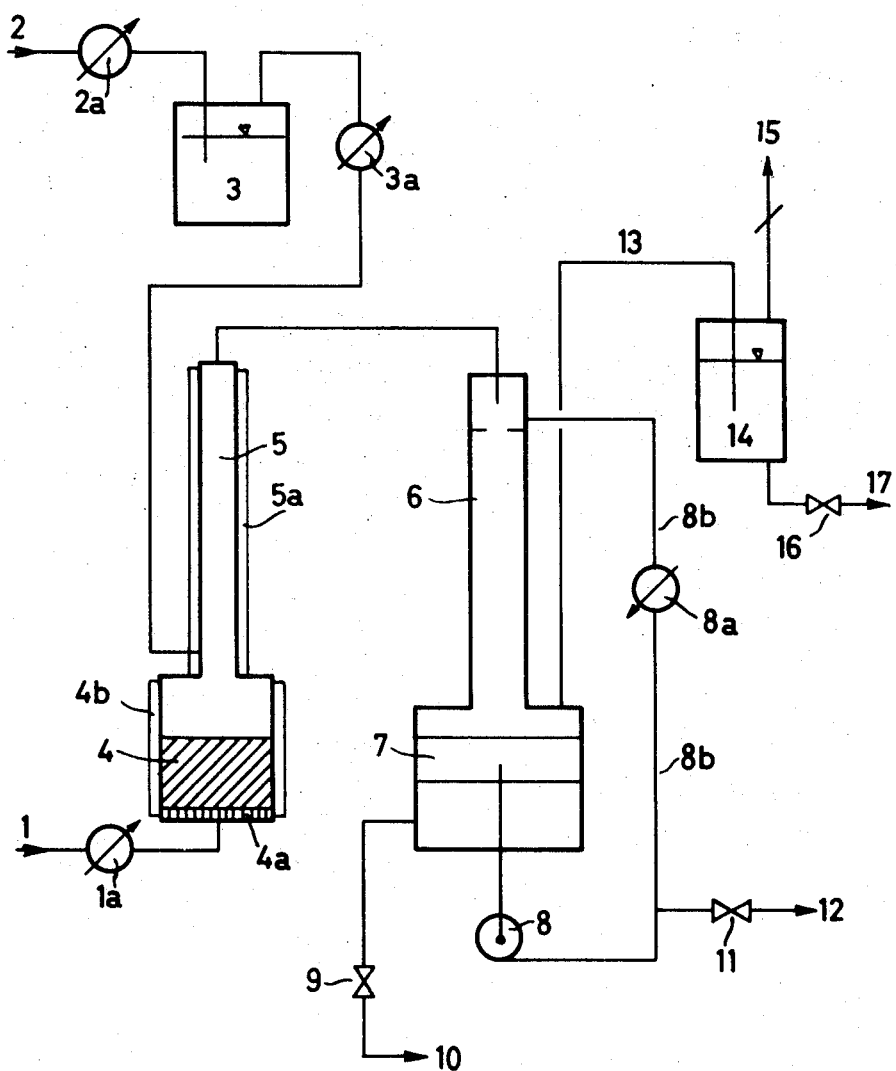

3,847,964
MANUFACTURE OF PERFLUOROCARBOXYLIC ACID NITRILES
Eckhard Hetzel, Frankenthal, and Olaf Korpiun, Heidelberg, Germany, assignors to Badische Anilin- & Soda-Fabrik Aktiengesellschaft, Ludwigshafen (Rhine), Germany
Filed Feb. 26, 1973, Ser. No. 335,818
Claims priority, application Germany, Feb. 25, 1972, P 22 08 923.2
Int. Cl. C07c 121/12
U.S. Cl. 260—465.2          5 Claims

ABSTRACT OF THE DISCLOSURE

An improved process for the manufacture of perfluorocarboxylic acid nitriles by reacting perfluorocarbonamides with phosphorus pentoxide at elevated temperatures, the improvement consisting in that the reaction is carried out in the gas phase at temperatures of from 450° to 600° C. with the use of inert carrier gases. Perfluorocarboxylic acid nitriles are intermediates in the manufacture of amines, themselves intermediates in the production of agents for rendering textiles oleophobic.

---

This invention relates to an improved process for the manufacture of perfluorocarboxylic acid nitriles by reacting perfluorocarbonamides with phosphorus pentoxide.

The reaction of carbonamides with phosphorus pentoxide is a well-known process for the manufacture of nitriles. This process may also be applied to the manufacture of perfluorinated carboxylic acid nitriles. Other known water-eliminating agents usch as phosphorus trichloride, phosphorus oxychloride and phosphorus pentachloride are not so suitable for the said reaction in the case of perfluorinated carbonamides. When water is eliminated from perfluorinated carbonamides with phosphorus pentoxide with the aid of solvents such as dimethyl formamide or methyl pyrrolidone, the solvents decompose under the reaction conditions and the yields obtained are only moderate. Furthermore, it is necessary to recover the expensive solvents used. However, if the process is carried out without solvents, the reaction mixture forms a cement-like mass under the conditions of the reaction, and this makes it difficult to control the temperature of the reaction and also leads to a drop in yield. Such a process can only be carried out batchwise and there are also great technical difficulties in working up the product with water on account of the considerable heat which is generated.

It is an object of the invention to provide a process with which perfluorocarboxylic acid nitriles may be obtained in good yields. It is a further object of the invention to provide a process which may be carried out continuously without difficulty. A final object of the invention is to provide a process in which no decomposable solvents requiring recovery are used.

In accordance with the present invention these and other objects and advantages are achieved in an improved process for the manufacture of perfluorocarboxylic acid nitriles by reacting perfluorocarbonamides with phosphorus pentoxide at elevated temperatures, the improvement consisting in that the reaction is carried out in the gas phase at temperatures of from 450° to 600° C. using inert carrier gases.

Preferred perfluorocarbonamides used as starting materials are aliphatic perfluorocarbonamides having from 2 to 16 carbon atoms and containing 1 carbonamide group in the molecule. The perfluorinated chain may be linear or branched. Particularly preferred perfluorocarbonamides have from 2 to 12 carbon atoms. It will be appreciated that the preferred perfluorocarbonamides give rise to preferred perfluorocarboxylic acid nitriles. Suitable perfluorocarbonamides are, for example, perfluoroacetamide, perfluoropropionamide, perfluoro-octanamide and perfluorocyclohexylcarbonamide.

The prefluorinated carbonamides are reacted with phosphorus pentoxide, advantageously at a molar ratio of from 1:1 to 1:10 and in particular from 1:2 to 1:6. The reaction is carried out at temperatures of from 450° to 600° C. Temperatures of from 460° to 560° C. have been found to give particularly good results. It is advantageous to adjust the residence time during the reaction to from 2 to 20 seconds.

The reaction is carried out in the gas phase using carrier gases. Suitable carrier gases are those which remain inert under the conditions of the reaction, for example nitrogen, helium and argon. Conveniently, nitrogen is used as the carrier gas. The process is advantageously carried out by passing the carrier gas through a fluidized bed of phosphorus pentoxide maintained at temperatures of from 450° to 600° C. and uniting said gas, above the bed, with a stream of gas containing perfluorocarbonamide. The latter stream of gas is produced, for example, by passing carrier gas through a bubble column of perfluorocarbonamide maintained at a temperature of 160° to 230° C. By adjusting the gas rates and the temperatures, it is easy to control the proportions of the feeds.

We have found it particularly advantageous to quench the gas mixture after the reaction to temperatures of from 15° to 25° C. It is particularly convenient to use water for this quenching operation. The water-insoluble perfluorocarboxylic acid nitrile may then be readily separated by known methods, for example decanting.

The process of the invention is carried out, for example, as follows, reference being made to the accompanying FIG. 1:

A stream of inert gas is passed at a controlled rate through line 1 to heat exchanger 1a, where it is preheated and then passed through a porous disk 4a to a fluidized bed 4 consisting of phosphorus pentoxide and heated at temperatures of from 460° to 560° C. A stream of inert gas is passed at a controlled rate through line 2 and is preheated to in heat exchanger 2a before passing to bubble column 3 filled with perfluorocarbonamide and heated at 150° to 230° C. The inert gas saturated with perfluorocarbonamide is then heated to from 460° to 560° C. in heat exchanger 3a and passes to tubular reactor 5 heated at from 460° to 560° C. and to which the gases rising from the fluidized phosphorus pentoxide bed are also passed. The mixture of vapors leaving reactor 5 is passed through the transfer line to the spray quencher 6, where it is cooled with water to the temperature stated, during which process excess phosphorus pentoxide and the perfluorocarboxylic acid nitrile are liquefied. The two liquid phases are separated in a separator 7, where the perfluorocarboxylic acid nitrile settles as heavier phase and is removed through a level controller comprising valves 9 and line 10. The aqueous quenching solution is looped back to the quencher 6 through pump 8, line 8b and cooler 8a. Via valve 11 and line 12 fresh water may be added to the loop or quenching solution may be removed therefrom in order to keep the concentration of phosphoric acid constant. That portion of the nitrile which is entrained by the carrier gas and not condensed in the quencher is passed through line 13 to a low-temperature cooler 14. The perfluorocarboxylic acid nitrile deposited therein is withdrawn through valve 16 and line 17. The carrier gas leaves the cooler through line 15.

Other variations of the method described may be used, for example it is possible to recycle the carrier gas, i.e. return the gas leaving the quenching cooler at room temperature directly to lines 1 and 2 for recharging with starting materials. Alternatively, the inert carrier gas may be saturated with perfluorocarbonamide and the resulting stream of carrier gas saturated with perfluorocarbonamide is passed through the fluidized bed containing phosphorus pentoxide. It is also possible to vaporize only phosphorus pentoxide in the presence of a carrier gas, whilst the perfluorocarbonamide is vaporized at ordinary pressure in the absence of a carrier gas, and then to pass the resulting streams of vapor to the reaction zone.

Perfluorocarboxylic acid nitriles prepared by the process of the invention are suitable for hydrogenation to amines (Dutch Pat. 6610936), which are used in the manufacture of agents for rendering textiles oleophobic (German published application 2,004,063).

The process of the invention is illustrated further in the following example.

EXAMPLE

A fluidized bed containing 300 g. of phosphorus pentoxide and heated at 500° C. is fed with nitrogen heated at 500° C. at a rate of 254 l./hr. (STP). Another stream of nitrogen is passed at a rate of 28 l./hr. (STP) through a bubble column filled with perfluoro-octanamide and heated at 160° C., the stream of gas then being heated to 300° C. Both the perfluoro-octanamide-laden gas stream and the phosphorus pentoxide-laden gas stream are passed to a reaction zone heated at 500° C., where they remain for a residence time of 18 seconds. The gas mixture leaving the reaction zone is cooled to 25° C. by sprinkling with water at the rate of 10 l./hr. Perfluoro-octanic acid nitrile separates from the resulting liquid as the heavy phase and is removed by decantation. In a test period of two hours there are obtained 55 g. of perfluoro-octanic acid nitrile, which is purified by washing with sodium carbonate solution followed by distillation. There are thus obtained 50.5 g. of perfluoro-octanic acid nitrile having a boiling range of from 100° to 160° C., this being equivalent to a yield of 60% based on perfluoro-octanamide used.

We claim:
1. An improved process for the manufacture of perfluorocarboxylic acid nitriles by reacting perfluorocarbonamides with phosphorus pentoxide at elevated temperatures, the improvement which comprises reacting in a reaction zone a perfluorocarbonamide with phosphorus pentoxide in the gas phase at temperatures of from 450° to 600° C. at a ratio in the reaction mixture of 1–10 moles of phosphorus pentoxide per mol of perfluorocarbonamide with a residence time of 2–20 seconds in said reaction zone, and using nitrogen as an inert carrier gas for the perfluorocarbonamide and the phosphorus pentoxide.

2. A process as claimed in claim 1, wherein aliphatic perfluorocarbonamides having from 2 to 16 carbon atoms are used as starting material.

3. A process as claimed in claim 1, wherein temperatures of from 460° to 560° C. are used.

4. A process as claimed in claim 1, wherein the gas mixture leaving the reaction zone is quenched to temperatures of from 15° to 25° C.

5. A process as claimed in claim 1, wherein water is used to quench the gas mixture leaving the reaction zone.

References Cited
UNITED STATES PATENTS

| | | | |
|---|---|---|---|
| 2,515,246 | 7/1950 | McBee et al. | 260—465.2 UX |
| 3,393,222 | 7/1968 | Schwarz et al. | 260—465.2 |
| 3,607,906 | 9/1971 | Hofmann | 260—465.2 |
| 2,788,362 | 4/1957 | Barnhart et al. | 260—465.2 |

FOREIGN PATENTS

| | | | |
|---|---|---|---|
| 1,081,444 | 5/1960 | Germany | 260—465.2 |

JOSEPH P. BRUST, Primary Examiner

U.S. Cl. X.R.

260—464